July 4, 1950 A. E. WOODRUFF ET AL 2,513,985

EAR CUSHION WITH EARPLUG

Filed Dec. 26, 1947

INVENTORS.
ALBERT E. WOODRUFF
THEODORE C. RIEBE

BY Chas. M. Candy.

ATTORNEY

Patented July 4, 1950 2,513,985

UNITED STATES PATENT OFFICE 2,513,985

EAR CUSHION WITH EARPLUG

Albert E. Woodruff and Theodore C. Riebe, Chicago, Ill., assignors to Automatic Electric Laboratories, Inc., Chicago, Ill., a corporation of Delaware Application December 26, 1947, Serial No. 793,834

3 Claims. (Cl. 179—182)

This invention relates to improvements in ear cushions used on telephone or radio receivers.

One object of the invention is to provide an ear cushion assembly adapted to be detachably fixed to a telephone or radio receiver, forming an air pocket to provide a soft yielding surface for contact with the outside surface of the ear of the user.

Another object of this invention is to provide an ear cushion with an ear plug arrangement suitable for fitting into the ear cavity of the ear of the user, to prevent passage of the outside sounds.

Another object of this invention is to provide an attachment or shell of soft sponge like rubber or other flexible material which fits close against the ear of the user and at the same time an ear plug fits snugly into the ear cavity, providing an arrangement which is substantially sound proof to extraneous sounds, whereby very weak incoming signals will be audible.

Other objects and advantages will appear in the following specifications, and the novel features will be pointed out in the appended claims.

Figure 3:
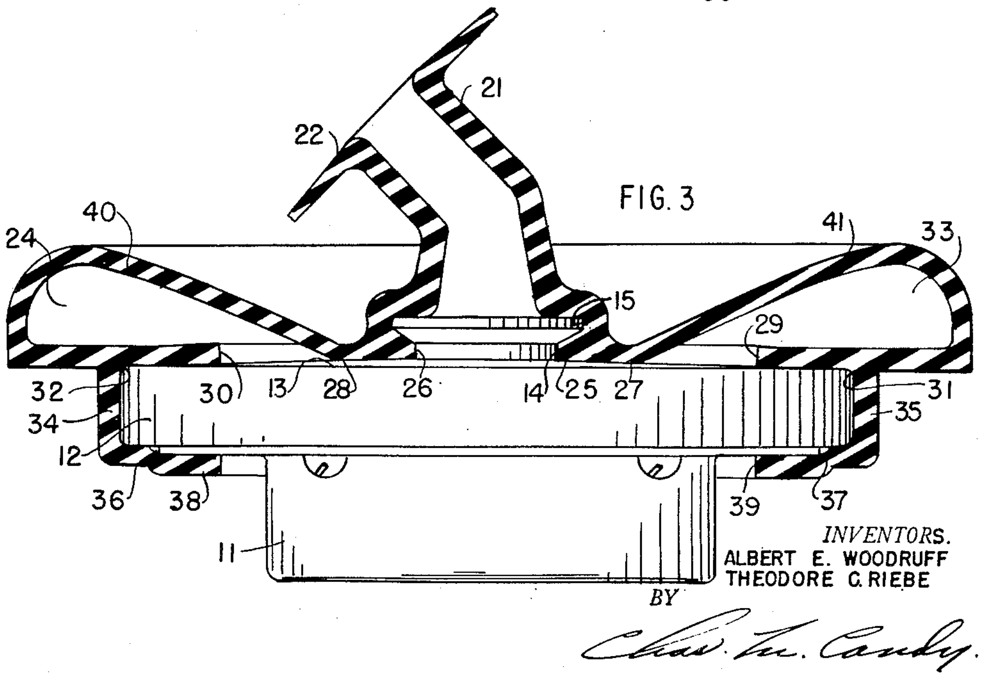

Figure 3, partly in cross-section shows the ear cushion of this invention, in position on an ordinary head band receiver.

The present embodiment of this invention comprises a moulded ear-cushion member which is detachably fixed to a receiver. This member is moulded from rubber or like flexible material and is so shaped as to fit snugly against the ear of the user as well as to provide a hollow stem to engage the ear cavity. In the preferred embodiment one ring portion 38—39 fits against the lower surface of a receiver shell and a second ring portion 29—30 fits against the top surface of the same shell and these two ring portions are joined by a wall 34—35 which fits against the outside edge of the shell whereby the ear cushion is detachably fixed to the receiver. Another ring portion 25—26 fits around a hollow stem member 14 which rises from the center portion of the metal clamping plate of the receiver. This third ring member 25—26 supports a hollow stem member 21, a portion of which is turned at an angle of approximately forty-five degrees from the general plane of the receiver diaphragm and the end of the stem 21 being provided with a turned over edge 22 for engaging that part of the ear cavity of the user, which cavity is known as the concha or deepest cavity of the external ear and which converges conically to the external auditory meatus. The second mentioned ring member 29—30 is joined to the third mentioned ring member 25—26 by a thin wall of soft flexible material, of which the moulded member is made, thus providing means for holding a quantity of air in captivity, resulting in an effective air cushion between the ear of the user and the receiver shell. At the same time an air channel is maintained for sound waves to travel directly from the receiver diaphragm to the ear drum of the user.

In carrying out this invention, use is made of the ordinary type of head band receiver having a body portion 11, an outlet 17 and conducting cord 16, having however the clamping plate 13 of the receiver provided with a protuberance including a stem portion 14, and an enlarged top or rim portion 15 with an outside diameter slightly larger than the outside diameter of the stem portion 14. This enlarged rim portion 15 fits tightly into an annular groove 23 in the ear cushion.

Figure 1:
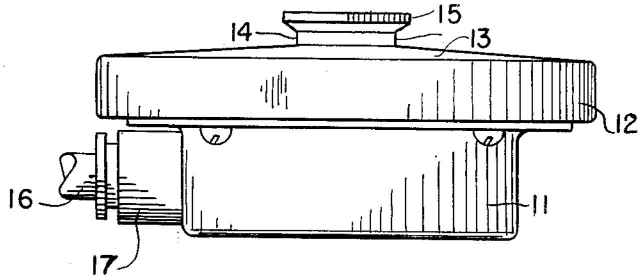
Figure 1 is a view of a telephone receiver, the outside of which is provided with a mounting arrangement for an ear cushion.
Figure 2:
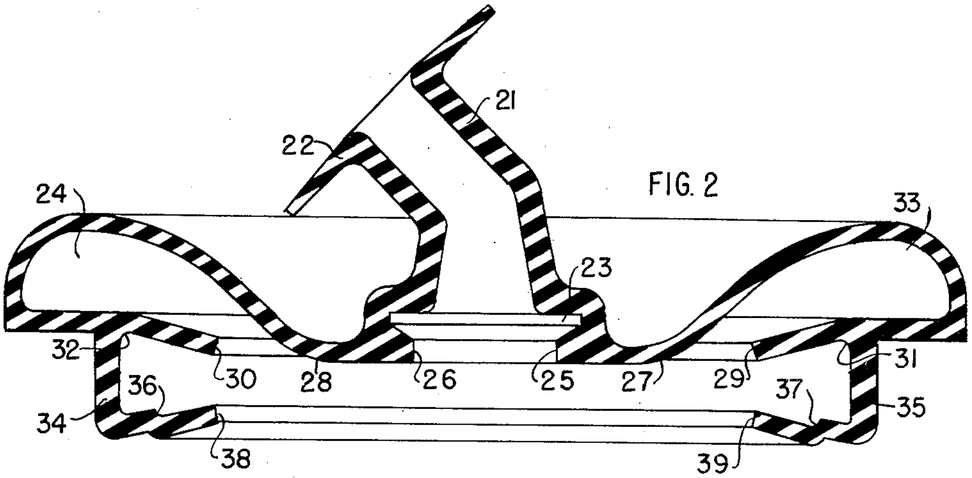
Figure 2 is a cross-section view of an ear cushion of this invention, provided with an ear plug 21 and arrangements for mounting on a telephone or radio receiver.

The ear cushion, Figure 2, is attached to the receiver by passing the top rim portion 15 into the annular opening 23 in the ear cushion, as seen in Figure 3, with the inside surfaces of the ear cushion between the points 25 and 27, 29 and 31, 26 and 28 and 30 and 32 seated on the slanting top surface of the clamping plate 13. Finally the side walls 34 and 35 are distorted to allow the retaining ring portions 37—39 and 36—38 of the ear cushion, to come into their correct positions against the rear or bottom surface of the receiver.

Attention is directed to the slightly different positions of some of the parts of the ear cushion as shown in Figures 2 and 3. It will be noted that the top surface of the clamping plate 13 is slanting downward in all directions, from the center-stem like-portion 14, to the periphery of the receiver. Therefore the upper inside ring surface of the ear cushion, which has a diameter from the point marked 27 to the point marked 28 and in which there is a center hole represented by the diameter from point 25—26, is now resting snugly on the top surface of the clamping plate 13, and further that the points 25 and 26, as shown in Figure 3 are slightly higher than shown in Figure 2, as a result of resting on the slanting surface of the clamping plate 13.

After the ring portions, such as 36—38 and 37—39 have been placed into position around the bottom edge of the receiver, it will be noticed that the soft rubber ring portion also covers a part of the lower surface of the receiver 11, the side walls of the ear cushion around the periphery of ring 12, such as portions 34 and 35, will also assume their correct position. It will now be seen that a completely enclosed circular cavity, designated by the numbers 24 and 33, has been formed and it is air tight, to all intents and purposes, and serves as a cushion which can be pressed against the ear of the user with no discomfort. The outside surfaces of the ear cushion, designated by the numers 40—41, are soft and due to the circular air cavity, represented by the numbers 24 and 33 being very flexible, the receiver can be moved back and forth, permitting the rim portion 22 of the ear plug 21 to become seated in the conchal cavity of the ear, thus completely excluding extraneous sounds.

This unique design prevents all outside sounds from entering the ear cavity of the user and therefore only the sounds generated by the diaphragm of the receiver are audible to the user.

What is claimed is:

1. In an ear piece for a sound receiver having a clamping plate provided with a central hollow metal stem with a rimmed top; a moulded ear piece of soft rubber or like material having integrally connected one to another a circular side wall for engaging the outer circular side wall of a receiver, a ringed portion of said moulded ear piece extending at right angles to said side wall for engaging the bottom surface of a receiver to hold the bottom edge of said side wall in close contact with the said bottom surface of said receiver, a second ring of said moulded earpiece extending at right angles to said side wall in close contact with the surface of said clamping plate for providing an air tight seal between said moulded earpiece and the surface of said clamping plate, a third ring of said moulded earpiece surrounding the said central hollow metal stem of said clamping plate to maintain air tight relations with the top surface of said clamping plate, a hollow stem of said earpiece rising from the center of the said third ring for insertion into the conchal cavity of the ear of the user, an annular groove on the inside of said hollow stem for engaging the said rimmed top of said central hollow metal stem of said clamping plate for holding said moulded ear piece on said clamping plate, and a curved upper wall of said moulded earpiece extending from said second ring to said third ring to provide a circular air pocket between the curved upper wall of said moulded earpiece and the said top surface of said clamping plate whereby said curved upper walls flexibly engage the head of the user while said hollow stem of the earpiece fits into the ear of the user.

2. In an ear piece for a sound receiver, a moulded cushion comprising two inner ring members resting against the top surface of the diaphragm clamping plate of a receiver and a curved outer wall interconnecting said two inner rings to form an air cavity or air pocket between said plate and said outer wall, a third ring member, resting against the bottom of said receiver, a side wall joined with the said second and said third rings to completely enclose the outer periphery of said receiver for maintaining said cushion on said receiver, a hollow moulded angularly bent stem extending upward from the center portion of said moulded cushion to engage the conchal cavity walls of the ear of the user of said receiver, said angularly bent hollow moulded stem for directing sound from said receiver along the natural path to the external auditory meatus circumventing the tragus and with the curved outer wall of said cushion cooperating with the ear of the user to exclude from said hollow stem and said ear all extraneous sounds.

3. In an earpiece for receivers, a member of moulded flexible material comprising a peripheral wall supported by a pocket of captive air, a hollow moulded stem rising from the center of said member and having a circular flexible rimmed top for engaging the walls of the conchal cavity of the ear of the user, an angular bend in said stem, said peripheral wall engaging the outside surface of a user's ear, said angular bend for directing said stem into the concha and circumventing the tragus and said circular rimmed top of said stem extending in said conchal cavity to exclude from said stem and said ear all extraneous sounds.

ALBERT E. WOODRUFF.
THEODORE C. RIEBE.

REFERENCES CITED

The following references are of record in the file of this patent:

UNITED STATES PATENTS

| Number | Name | Date |
|---|---|---|
| 1,249,962 | Lundgren | Dec. 11, 1917 |
| 1,489,978 | Byron | Apr. 8, 1924 |
| 1,584,662 | Schulhoff | May 11, 1926 |
| 1,623,552 | Pollard | Apr. 5, 1927 |
| 1,624,144 | Mathien | Apr. 12, 1927 |
| 2,235,372 | Kalbitz | Mar. 18, 1941 |
| 2,353,070 | Pitkin | July 4, 1944 |
| 2,430,229 | Kelsey | Nov. 4, 1947 |